United States Patent [19]

Grimm et al.

[11] Patent Number: 4,755,334
[45] Date of Patent: Jul. 5, 1988

[54] PROCESS FOR THE CONTINUOUS PRODUCTION OF ARTICLES OR COATINGS WITH CONTOURS OF COMPLICATED SHAPE

[75] Inventors: Wolfgang Grimm, Leverkusen; James M. Barnes, Wermelskirchen, both of Fed. Rep. of Germany

[73] Assignee: Bayer Aktiengesellschaft, Leverkusen, Fed. Rep. of Germany

[21] Appl. No.: 741,513

[22] Filed: Jun. 5, 1985

[30] Foreign Application Priority Data

Jun. 8, 1984 [DE] Fed. Rep. of Germany ....... 3421363

[51] Int. Cl.⁴ .................. B29C 41/30; B29C 41/52
[52] U.S. Cl. .................. 264/40.7; 264/167; 264/171; 264/310; 264/326; 264/DIG. 74; 425/224; 425/371
[58] Field of Search .............. 264/40.7, 134, 136, 264/167, DIG. 74, 165, 166, 172, 214, 171, 310, 326; 425/4 C, 17, 20, 115, 116, 134, 814, 371, 224

[56] References Cited

U.S. PATENT DOCUMENTS

| | | | |
|---|---|---|---|
| 3,226,457 | 12/1965 | Smith, Jr. ............................. | 264/214 |
| 3,267,191 | 8/1966 | Williams et al. ..................... | 264/166 |
| 3,487,143 | 12/1969 | Bergvall .............................. | 425/371 |
| 3,660,548 | 5/1972 | Komada et al. ..................... | 264/172 |
| 4,309,375 | 1/1982 | Rabenecker ......................... | 264/167 |

FOREIGN PATENT DOCUMENTS 1101786 3/1968 United Kingdom .
2114049 8/1983 United Kingdom .

Primary Examiner—Jeffery Thurlow
Attorney, Agent, or Firm—Gene Harsh; Joseph C. Gil; Aron Preis

[57] ABSTRACT

The present invention is directed to a process for the continuous production of articles or coatings with contours wherein a liquid material is introduced at one end into the mold cavity formed between at least two travelling continous shaping faces, said material being cured in the mold cavity and subsequently removed from the mold, characterized in that (i) the travelling faces are moved downwards at least in the region of the material feed, (ii) the stream of material supplied is moved to and fro transversely to the direction of advance of the faces, and (iii) the quantity of material supplied is controlled so as to fill the mold cavity with a uniform coating and an apparatus for use therein.

5 Claims, 5 Drawing Sheets

PROCESS FOR THE CONTINUOUS PRODUCTION OF ARTICLES OR COATINGS WITH CONTOURS OF COMPLICATED SHAPE

BACKGROUND OF THE INVENTION

The present invention relates to a process and an apparatus for the continuous production of articles or coatings with contours of complicated shape, wherein a liquid material is introduced at one end into a mold cavity formed between at least two travelling continuous molding faces, is cured in the mold cavity and is then removed from the mold.

It has been known for some time that a smooth external coating can be achieved by pouring reacting polymers onto rotating bodies without a mold.

It is also known (German Offenlegungsschrift No. 32 00 063) that toothed belts can be produced by introducing a liquid polymer into a mold cavity comprising travelling faces which is completely sealed at the sides and using a feed device at the inlet side. The seal on the inlet side is very complicated and susceptible to breakdown. It can be particularly complicated if additional reinforcing inlays are to be used.

The object of the present invention was the development of a process and an apparatus so that articles or coatings with contours of complicated shape could be produced from liquid material and the seal-free supply of material (and optionally of reinforcing inlays) was possible. It was also necessary to ensure that the travelling mold cavity was filled completely and uniformly.

Figure 1:
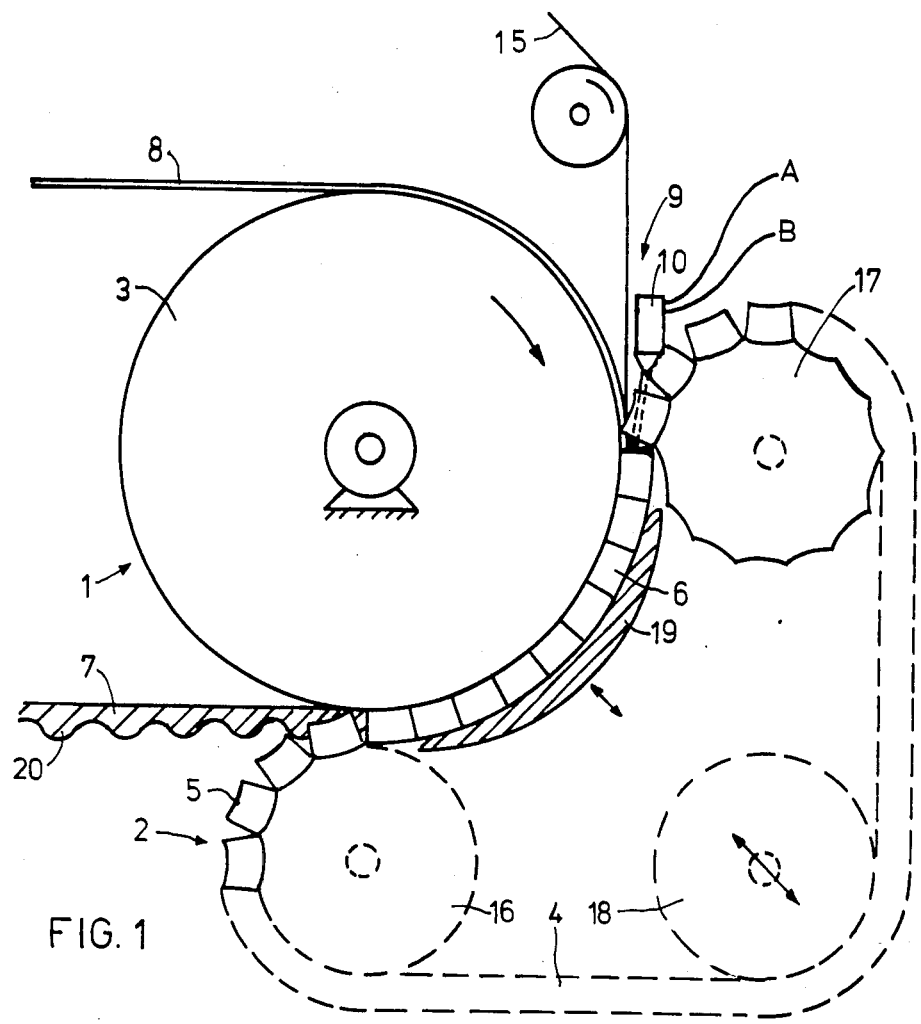
FIG. 1 shows a side view of an embodiment of the apparatus for producing toothed belts.

The above-noted object is achieved in that the travelling faces are moved downwards at least in the region of the material feed. The stream of material supplied is guided to and fro transversely to the direction of advance of the faces. Finally, the quantity of material supplied is controlled so as to fill the mold cavity with a uniform coating while taking into consideration the rate of advance of the faces and the respective width of the cavity beneath the stream.

In comparison with all previously known processes, the new process permits production of articles or coatings regardless of the direction in which they are contoured. It is not necessary to seal the inlet side of the mold cavity.

Control is preferably effected by varying the rate of advance of the travelling faces. According to a different embodiment of the process, control is effected by varying the oscillation rate of the stream while the quantity supplied remains constant. Alternatively, control is effected by varying the quantity supplied while the oscillation rate of the stream remains constant. Although both variations can be readily carried out, the first variation is more advantageous because it is simpler to vary the oscillation rate of the stream using program control than to influence the quantity supplied. Since the second variation involves influencing the metering pumps, a certain inertia would occur in the supply system.

Control is therefore effected in such a way that the stream which is travelling to and fro is precisely coordinated to travel faster at points where the article or coating to be produced is less thick than at points of greater thickness. If the contouring of the article to be produced runs transversely, the oscillation rate remains constant during one stroke, but varies between the strokes according to the volume to be filled.

Polymeric compounds such as polyurethane elastomers based on polyethers and/or polyesters, preferably with a curing time of 0.5 to 180 seconds are preferably used as liquid material. These materials are particularly desirable for many applications due to their particular properties. The possible applications of such materials are increased as a result of the new production process. Thermoplastics can obviously also be processed from polyesters or epoxide resins.

The apparatus for carrying out the new process is based on at least two encircling continuous faces of which at least one is composed of individual mold segments. These faces enclose between them a laterally sealed mold cavity. A feed device is arranged at the inlet of the mold cavity.

The novelty resides in the fact that (i) the travelling faces are directed downwards in the region of the feed device, (ii) the feed device can be moved to and fro transversely, and (iii) the driving mechanisms for the feed device and/or the pump(s) allocated to the device are connected to a program control instrument.

The apparatus is thus simplified in design in that the feed position itself is not sealed but rather the feed device points directly into the open inlet of the mold cavity. The driving mechanism and the pumps or corresponding elements of the feed device are coupled so that the quantity of liquid material supplied corresponds exactly to the respective volume to be filled at any moment.

According to one particular embodiment, one of the travelling faces is formed by a rotating body whose peripheral area is partially covered by the mold segments of the other travelling face so as to form the mold cavity. This embodiment allows direct coating of rotating bodies or production of rotationally symmetric articles.

According to a further particular embodiment, the rotating body consists of a vehicle tire requiring retreading. In this way, it is possible to provide, in particular, large polyurethane tires of the type used, for example, on earth-moving plant, with a new tread, while using relatively inexpensive machinery.

According to another particular embodiment, the rotating body consists of a roller body to be coated.

The new apparatus permits production of a coating of uniform thickness or a coating with profiling.

With rotating bodies of relatively large diameter, it is possible to provide two travelling opposing faces with feed devices so that several layers can be applied in one operation. It is also possible providing the lateral seal is suitably designed, to drive the two travelling faces forming the mold cavity apart after a first coating rotation of the rotating body, so that a second coating process and, optionally, even more coating processes, can take place. After a first coating process, either the rotating body is supplied to a second opposing face or, alternatively, a second opposing face is fed to the rotating body. This embodiment is suitable for large numbers of articles.

According to another particular embodiment of the apparatus, the travelling faces consist of continuous strips arranged in parallel which run around deflecting rollers and of which at least one has mold segments. The strips are provided with rear supports in the region of the mold cavity. By contrast to the embodiments just described, in which the mold cavity is curved, in this case it is straight. This embodiment is particularly suitable for the production of strip-form continuous articles having relatively large dimensions.

The new apparatus herein can be supplemented by known auxiliary attachments for introducing reinforcing inlays in the form of fabric strips, continuous rovings, and fiber fleeces, composed of glass fibers, plastics material or metal.

Several embodiments of the new apparatus for various applications are shown schematically in the drawings and described in detail below.

Figure 2:
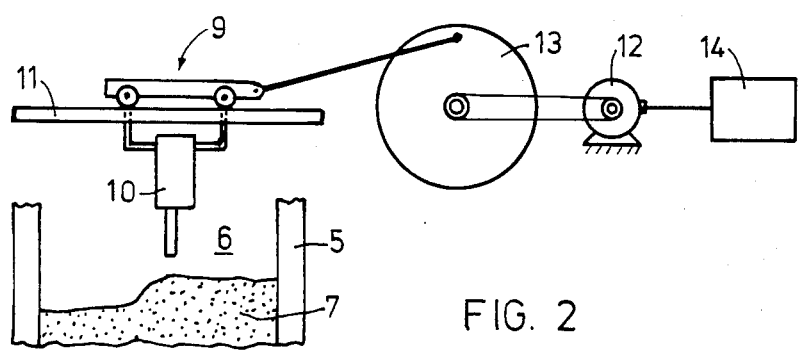
FIG. 2 shows a front view of the material feed for the apparatus in FIG. 1.

In FIGS. 1 and 2, the apparatus consists of two shaping faces 1, 2. The face 1 represents the peripheral face of a drum 3. The face 2 consists of an endless chain 4 consisting of shaped segments 5. The shaping faces 1, 2 enclose between them a mold cavity 6 which extends over a portion of the drum periphery 3. The length of this mold cavity 6 is dependent on the rate of advance of the faces 1, 2 in such a way that the article produced should have stability of shape on leaving the mold cavity 6. Before the production is started, a sealing plug is introduced into the mold cavity 6 to prevent flowing out. A web of carrier material 8 composed of a fabric which is impregnated with the liquid material supplied (a thermoplastic polyurethane elastomer in liquid form) is supplied via the drum 3 before the material cures. Liquid components A (polyol) and B (isocyanate) are supplied and mixed together using a feed device 9, which at the same times acts as a mixer and introduces the mixture into the mold cavity 6.

The feed device 9 consists of a mixer head 10 capable of travelling to and fro on rails 11 transversely to the direction of advance of the faces 1 and 2. An electric motor 12 and crank mechanism 13 of adjustable stroke serves as driving mechanism. The stroke speed of the feed device 9 should be sufficiently high for the newly applied layer to bond to the layer beneath it before the layer beneath it cures. The feed device 9 is coupled to a program control instrument 14 indicated schematically. It gives commands so that the feed device 9 oscillates correspondingly more slowly, thus supplying sufficient material, when a respective tooth 20 of the toothed belt 7 is to be formed (if the faces 1, 2 advance at a uniform rate). A reinforcing inlay 15 is also introduced continuously into the mold cavity 6. The chain 4 of shaped segments 5 runs round deflecting rollers 16, 17 and a tension wheel 18. The deflecting rollers 16, 17 are movable relative to the drum 3 so that the height of the mold cavity can be adjusted if necessary. In the region where the drum 3 is looped by the chain 4 composed of shaped segments 5, the chain is supported between the deflecting rollers 16, 17 by a sliding block 19.

Figure 3:
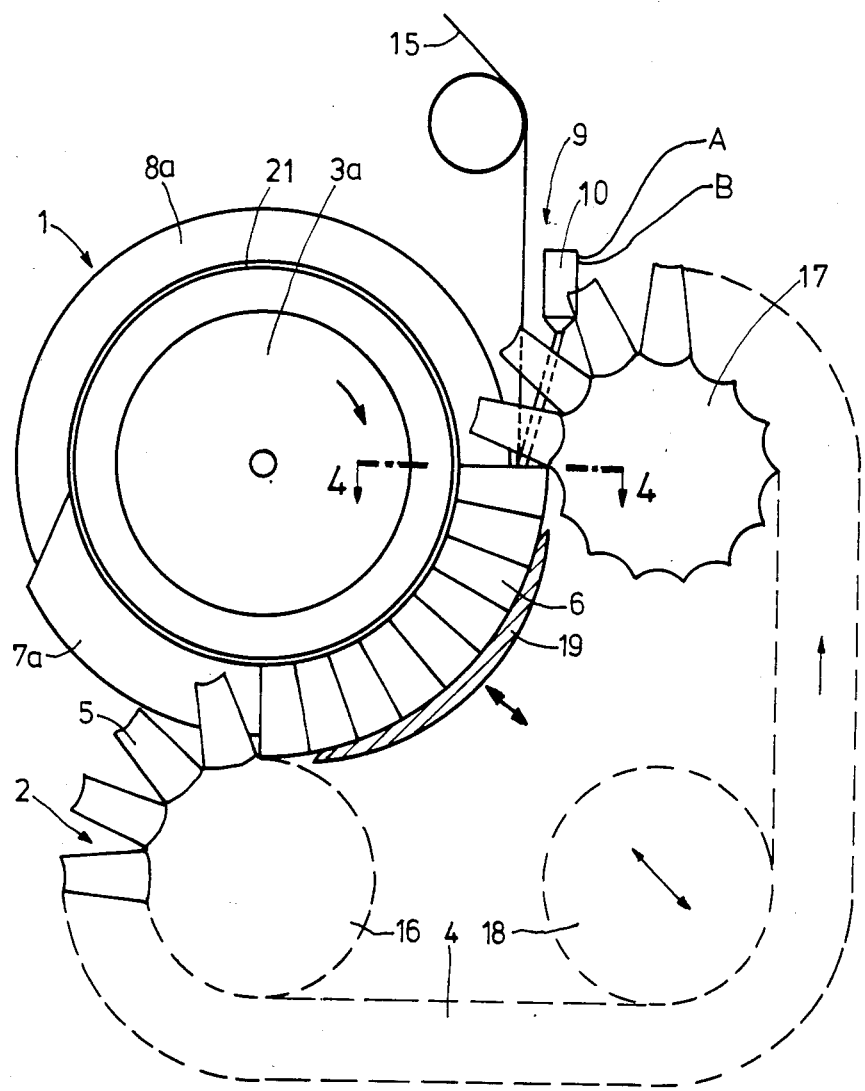
FIG. 3 shows a side view of an embodiment of the apparatus for retreading vehicle tires.
Figure 4:
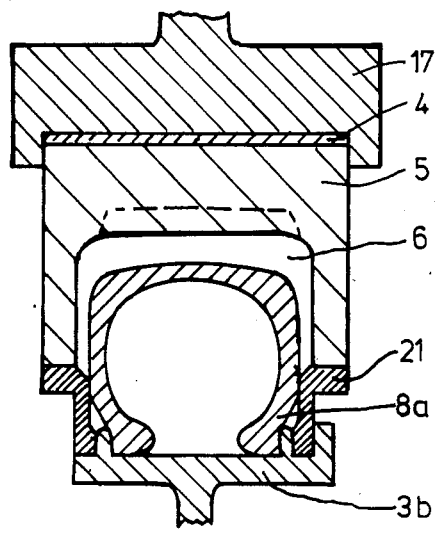
FIG. 4 shows a section along line 4—4 of FIG. 3.

The apparatus in FIGS. 3 and 4 is of similar structure to the apparatus in FIGS. 1 and 2 and so the same reference numerals are used. The only difference lies in the fact that a rotatably mounted rim 3a is provided as a carrier material for a vehicle tire 8a requiring retreading, instead of the drum 3. The shaped segments 5 of the chain 4 do not have a negative tooth profile in this case but a profile for tires. Sealing rings 21 arranged on the side of the rim produce the lateral seal to the mold cavity 6 formed. A reinforcing web 15 runs into the cavity 6.

Retreading takes place during a single rotation of the tire 8a. The finished tire is designated by 7a.

Figure 5:
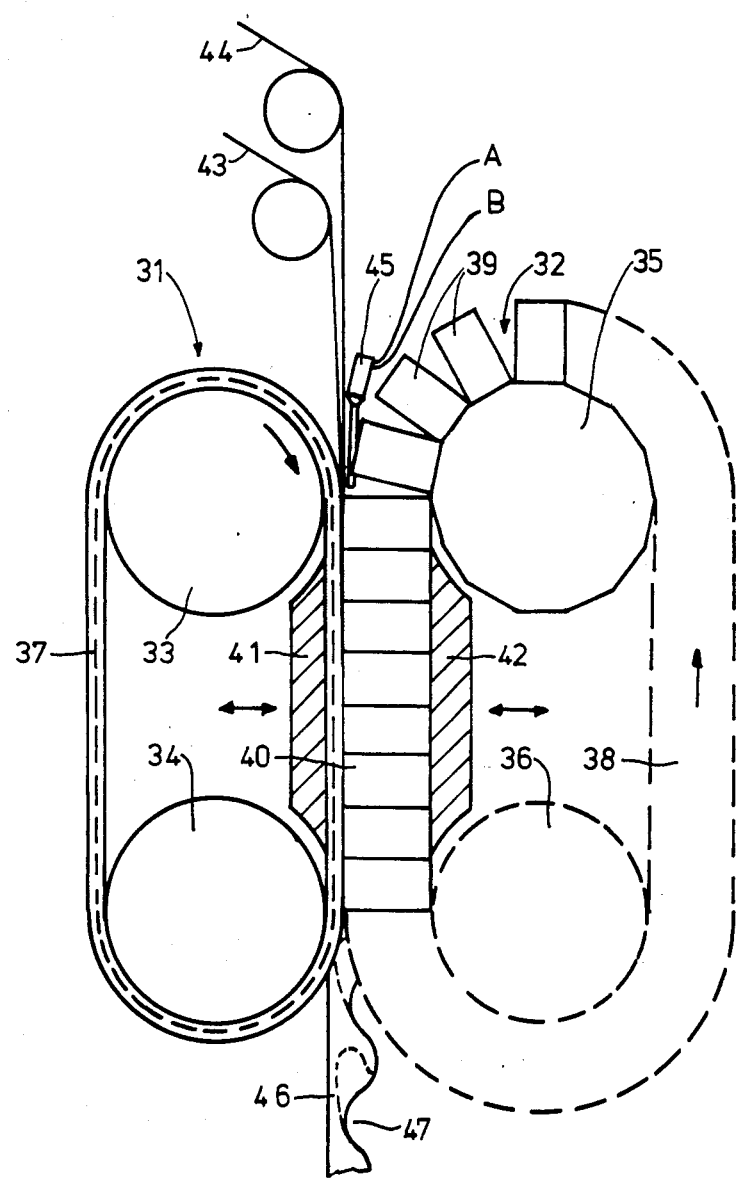
FIG. 5 shows an embodiment of the apparatus for producing a conveyor belt with conveyor pockets.

In the apparatus according to FIG. 5, moving faces 31, 32 run parallel to each other round deflecting wheels 33, 34 or 35, 36. The moving face 31 is formed by an encircling strip 37 and the moving face 32 by a chain 38 composed of shaped segments 39. The mold cavity 40 is formed between them. In the region of the mold cavity 40, the strip 37 and the chain 38 or the shaped segments 39 are supported by sliding plates 41, 42. Two reinforcing webs 43, 44 composed of fabric run into the mold cavity 40. A reaction mixture which forms a polyurethane elastomer is applied using the feed device 45 corresponding to the feed devices of FIGS. 1 and 2. The article to be produced is a conveyor belt 46 with conveyor pockets 47. The shaped segments 39 are designed such that they form the internal profile of the conveyor pockets and the external profile thereof.

Figure 6:
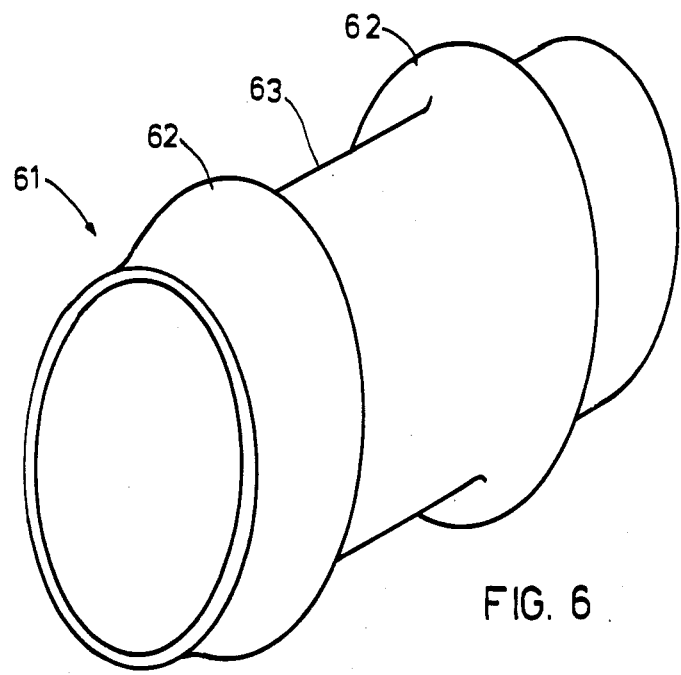
FIG. 6 shows a finished roller covering in a relief diagram.
Figure 7:
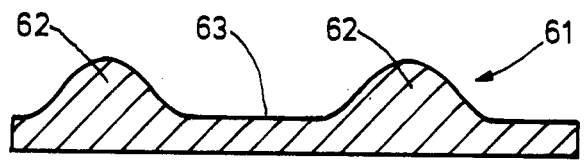
FIG. 7 shows a cross-section through the roller covering of FIG. 6.

The roller covering 61 according to FIGS. 6 and 7 has peripheral beads 62 between which a flat peripheral portion 63 extends. This roller covering 61 was produced in a single coating pass on an apparatus according to FIGS. 1 and 2 with suitably designed shaped segments.

Figure 8:
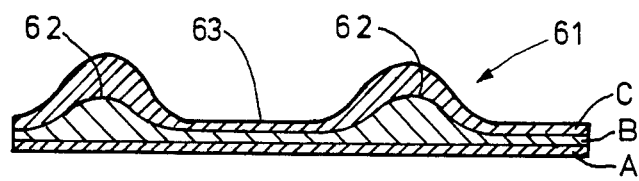
FIG. 8 shows a cross-section through an alternative embodiment of the roller covering of FIG. 6.

The roller covering 61 according to FIG. 8 was produced by coating several times, a coating B of medium hardness with peripheral beads 62 being applied to a base layer A of uniform thickness and high hardness, the layer B in turn being covered by a layer C of low hardness, with the peripheral beads 62 thus being further reinforced.

EXAMPLES

Example 1

The apparatus according to FIGS. 1 and 2 was used. The faces 1, 2, i.e. the carrier web 8 and the shaped segments 5 travel at a speed of 0.314 m/min. The cross-sectional area of the mold cavity 6 varies during the advancing movement between a minimum of 50 cm$^2$ and a maximum value of 250 cm$^2$. As the face 1 is flat, the height of the contour of the entering shaped segments 5 can be electronically scanned continuously and the oscillation rate of the feed device 9 can be controlled as a function thereof. The output of the feed device 9 is a continuous 3.34 kg/min. A mixture of 100 parts by weight of a TDI ester prepolymer, such as, for example, BAYTEC ® VP PU 0137 (product and trademark of BAYER AG, D-5090 Leverkusen-Bayerwerk, Federal Republic of Germany) and 10.4 parts by weight of the diamine preparation BAYTEC ® cross-linking agent 110 from BAYER AG is applied and the solidification time is 30 seconds.

EXAMPLE 2

A tire is given a new tread using the apparatus according to FIGS. 3 and 4. The rim 3a rotates at 0.25 rpm. The feed device 9 delivers 9.5 kg/min of reactive mixture consisting of 100 parts by weight of the TDI ester prepolymer BAYTEC® VP PU 0137 from BAYER AG and 36 parts by weight of a polyester diamine mixture consisting of 30 parts by weight of the ethanediol butanediol adipic acid ester having an average molecular weight of 2,000 Desmophen® 2001 KS from BAYER AG and 6.6 parts by weight of the diamine preparation BAYTEC® cross-linking agent 110 from BAYER AG. The solidification time is 45 seconds.

EXAMPLE 3

A conveyor belt with conveyor pockets according to page 10, line 10 et seq. of the specification is produced. The feed device 45 moves from side to side. The output is a continuous 6.20 kg/min.

A mixture of 100 parts by weight of the polyether diamine mixture BAYTEC® VP PU 0308 from BAYER AG and 77 parts by weight of the MDI polyether prepolymer BAYTEC® VP PU 0309 from BAYER AG is applied. The solidification time is 25 seconds.

EXAMPLE 4

In this example a roller covering was produced which had a width of 0.8 m and the same composition as in Example 3, but the output was only 4.60 kg/min.

EXAMPLE 5

In this example a hard coating is first poured on to a freely rotating roller in such a manner that the mixing head moving along the roller at a constant forward movement (21 cm/min) and pours on a coating having a thickness of about 3 mm and a Shore A hardness of about 90, given a roller diameter of 320 mm, at a constant output (0.8 kg/min); the coating consists of 100 parts by weight of a TDI prepolymer mixture consisting of 25 parts by weight of the TDI prepolymer BAYTEC® VP PU 0127 from BAYER AG and 75 parts by weight of the TDI prepolymer BAYTEC® VP PU 0137 from BAYER AG and 12.5 parts by weight of the diamine preparation BAYTEC® cross-linking agent 110.

Then a layer with a Shore A hardness of about 80 is applied, in a profile-providing manner, on top of the above coating at a constant output (0.92 kg/min) and with a varying forward movement (11 to 30 cm/min) of the mixing head moving along the roller.

100 Parts by weight of the TDI prepolymer BAYTEC® VP PU 0137 from BAYER AG and 19.2 parts by weight of a polyester diamine mixture consisting of 10 parts by weight of the ethanediol butanediol adipic acid ester having an average molecular weight of 2,000 Desmophen® 2001 KS from BAYER AG and 9.2 parts by weight of the diamine preparation BAYTEC® cross-linking agent 110 from BAYER AG.

Then a layer with a Shore A hardness of about 68 is applied as the final layer also at a constant output (0.76 kg/min) and with a varying forward movement (16 to 32 cm/min): 100 Parts by weight of the TDI prepolymer BAYTEC® VP PU 0137 from BAYER AG and 36.6 parts by weight of the ethanediol butanediol adipic acid ester DESMOPHEN® 2001 KS from BAYER AG and 6.6 parts by weight of the diamine preparation BAYTEC® cross-linking agent 110 from BAYER AG.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the continuous production of articles or coatings with contours wherein a liquid material is introduced at one end into the mold cavity formed between at least two travelling continuous shaping faces, said material being cured in the mold cavity and subsequently removed from the mold, characterized in that (i) the travelling faces are moved downwards at least in the region of the liquid material feed, (ii) the stream of liquid material supplied is moved to and fro transversely to the direction of advance of the faces, and (iii) the quantity of liquid material is supplied through an open inlet of the mold cavity and is controlled so as to fill the mold cavity with a coating having a non-uniform thickness said control being effected by varying the rate of advance of the travelling faces or by varying the oscillation rate of the stream while the quantity of liquid material supplied to the mold remains constant or by varying the quantity of liquid material supplied to the mold while the oscillation rate of the stream remains constant.

2. The process of claim 1, characterized in that control is effected by varying the rate of advance of the travelling faces.

3. The process of claim 1, characterized in that control is effected by varying the oscillation rate of the stream while the quantity of liquid material supplied to the mold remains constant.

4. The process of claim 1, characterized in that control is effected by varying the quantity of liquid material supplied to the mold while oscillation rate of the stream remains constant.

5. The process of claim 1, characterized in that polyurethane elastomer forming materials are used as the liquid material.

* * * * *